(12) United States Patent
Lee et al.

(10) Patent No.: US 12,185,696 B2
(45) Date of Patent: Jan. 7, 2025

(54) PET TOY

(71) Applicant: Monchball IP Pty Ltd, New Farm QLD (AU)

(72) Inventors: Bartholomew Michael Lee, New Farm QLD (AU); Claire Jemimah Reilly, New Farm QLD (AU)

(73) Assignee: Monchball Pty Ltd., New Farm (AU)

( * ) Notice: Subject to any disclaimer, the term of this patent is extended or adjusted under 35 U.S.C. 154(b) by 34 days.

(21) Appl. No.: 17/798,378

(22) PCT Filed: Feb. 24, 2021

(86) PCT No.: PCT/AU2021/050157
§ 371 (c)(1),
(2) Date: Aug. 9, 2022

(87) PCT Pub. No.: WO2021/168508
PCT Pub. Date: Sep. 2, 2021

(65) Prior Publication Data
US 2023/0061870 A1    Mar. 2, 2023

(30) Foreign Application Priority Data
Feb. 24, 2020   (AU) ................................ 2020900524

(51) Int. Cl.
*A01K 15/02*    (2006.01)
*A01K 5/01*    (2006.01)

(52) U.S. Cl.
CPC .......... *A01K 15/025* (2013.01); *A01K 5/0114* (2013.01)

(58) Field of Classification Search
CPC ... A01K 5/0114; A01K 15/025; A01K 15/026
(Continued)

(56) References Cited

U.S. PATENT DOCUMENTS 4,321,888 A * 3/1982 Topliffe ............... A01K 15/025
                                                                 473/576
6,237,538 B1 * 5/2001 Tsengas ............... A01K 5/0114
                                                                 119/710
(Continued)

FOREIGN PATENT DOCUMENTS

CN      109997721 A  *  7/2019
KR      10-1820411 B1    1/2018
WO   WO-2018144349 A1 *  8/2018 ........... A01K 15/026

OTHER PUBLICATIONS

International Search Report and Written Opinion of International Searching Authority corresponding to International Patent Application No. PCT/AU2021/050157, mailed Mar. 31, 2021 (11 pages).

(Continued)

*Primary Examiner* — Tien Q Dinh
*Assistant Examiner* — Erica Michelle Huebner
(74) *Attorney, Agent, or Firm* — Ice Miller LLP; Justin D. Swindells

(57) ABSTRACT

A pet toy including a body having a cavity formed therein for receiving a pet treat. A clip arrangement releasably connects first and second portions of the body. A securing member is located within the cavity and extends between two opposed surfaces of the cavity, and retains a portion of the pet treat within the cavity. The body defines a recess for receiving the securing member. The securing member extends from the first portion and is received in a recess defined in the second portion when the first and second portions are connected.

17 Claims, 13 Drawing Sheets

(58) Field of Classification Search
USPC .................................................. 119/707, 709
See application file for complete search history.

(56) References Cited

U.S. PATENT DOCUMENTS

| | | | |
|---|---|---|---|
| 2006/0048718 A1 | 3/2006 | Mann | |
| 2009/0064942 A1 | 3/2009 | Shatoff et al. | |
| 2009/0217885 A1* | 9/2009 | Peter | A01K 15/025 119/709 |
| 2015/0342145 A1* | 12/2015 | Christianson | H04W 4/80 119/51.01 |
| 2016/0007572 A1 | 1/2016 | Aked-Hurditch | |
| 2017/0055498 A1* | 3/2017 | McNulty | F16B 7/04 |
| 2017/0112100 A1 | 4/2017 | Labitzke | |
| 2018/0160648 A1* | 6/2018 | Goh | A01K 15/02 |
| 2019/0141954 A1 | 5/2019 | Yuan et al. | |
| 2020/0113152 A1* | 4/2020 | Mcfarlane | A01K 15/026 |
| 2020/0154676 A1* | 5/2020 | Walt | A01K 15/026 |

OTHER PUBLICATIONS

Extended European Search Report in related application EP 21759011.6, Mar. 18, 2024, 12 pages.

* cited by examiner

PET TOY

CROSS-REFERENCE TO RELATED APPLICATIONS

This application is a U.S. National Stage of International Application No. PCT/AU2021/050157, filed Feb. 24, 2021, which claims the benefit of Australian Patent Application No. 2020900524, filed Feb. 24, 2020, both of which are incorporated herein by reference in their entireties.

TECHNICAL FIELD

The present disclosure relates to a pet toy. In particular, the invention relates, but is not limited to, a pet toy for securing a treat within a cavity to minimise choking hazards for a pet.

BACKGROUND

Any references to methods, apparatus or documents of the prior art are not to be taken as constituting any evidence or admission that they formed, or form, part of the common general knowledge.

Consumable pet toys and treats, such as dried animal flesh including bully sticks and rawhide chews, are a popular treat for dogs as both time consuming items of interest for the dog and as a way to clean a dog's teeth and maintain oral health.

However, these long-lasting consumable treats and toys are often incredibly hard and dense. While this hardness and density maximises chewing time, it also presents a significant choking hazard, especially for small dogs or dogs that are very food-focused or that become overexcited when presented with food or treats.

In addition, if the dog manages to consume a large piece of a treat without choking, the large piece may cause an internal blockage (e.g. in the dog's intestines) which may require emergency surgery that can be both expensive and damaging to the long-term health and quality of life of the dog.

OBJECT

It is an aim of the embodiments of the present invention described herein to provide a pet toy which overcomes or ameliorates one or more of the disadvantages or problems described above, or which at least provides a useful commercial alternative.

Other preferred objects of the present invention will become apparent from the following description.

SUMMARY OF THE INVENTION

In one form, although it need not be the only or indeed the broadest form, there is provided a pet toy comprising:
 a body having a cavity formed therein for receiving a pet treat; and
 a securing member located within the cavity, the securing member for retaining a portion of the pet treat within the cavity.

Preferably, the securing member is adapted to receive a pet treat thereabout and retain a portion of the pet treat within the cavity formed in the body.

Preferably, the securing member extends between two opposed surfaces of the cavity. Preferably, the securing member extends between two opposed surfaces defining or surrounding the cavity.

Preferably, the body comprises two releasably connectable portions. Preferably, the two releasably connectable portions of the body comprise a first portion and a second portion. Preferably, each of the first and second portions comprise a hemispherical or semi-spherical body which connect to form a spherical body. Preferably, the first and second portions of the body are releasably connectable by a flexibly resilient releasable buckle clip arrangement or clip arrangement. Preferably, the clip arrangement comprises one or more resilient flexible projections and one or more corresponding grooves for receiving and retaining the resilient flexible projections.

Preferably, the two releasable connectable portions comprise an alignment arrangement. Preferably, the alignment arrangement comprises a male connector and a reciprocally shaped female connector, wherein the male connector is located on a surface of the first portion and the female connector is located on an opposing surface of the second portion.

Preferably, the securing member extends through the cavity. Preferably, the securing member is secured within one of the two opposed surfaces of the cavity. Preferably, the securing member comprises a pin secured within one of the two opposed surfaces of the cavity. Preferably, a first surface of the cavity is located on the first portion of the two releasably connectable portions and a second surface of the cavity is located on the second portion of the two releasably connectable portions.

Preferably, the securing member is fixedly attached to one of the two opposed surfaces of the cavity. Alternatively, the securing member is removably attached to one of the two opposed surfaces of the cavity.

Preferably, the body further comprises a passage formed therein. Preferably, the passage comprises an open-ended passage adapted to receive a rope.

Preferably, the cavity is an open cavity formed in a surface of the body. Preferably, the cavity is substantially enclosed by the body. Preferably, an opening of the cavity is substantially rectangular or ovoid to provide access to the cavity.

Preferably, the body is integrally formed.

Preferably, the cavity is a first cavity. Preferably, the body comprises a second cavity formed therein for receiving a pet treat. Preferably, the pet toy further comprises a second securing member located within the second cavity and extending between two opposed surfaces of the cavity. Preferably, the securing member retains a portion of the pet treat within the second cavity.

Preferably, the second cavity is formed in a substantially opposite side of the body to the first cavity. Alternatively, the second cavity is formed in a same side of the body as the first cavity. Preferably, the second cavity extends through the first cavity. Preferably, the second cavity extends longitudinally through the first cavity. Preferably, a longitudinal axis of the second cavity extends perpendicular to a longitudinal axis of the securing member.

Preferably, the first cavity comprises a first cavity depth and a first cavity width. Preferably, the second cavity comprises a second cavity depth and a second cavity width. Preferably, the first cavity depth is greater than the second cavity depth. Preferably, and in some embodiments, additionally, the first cavity width is less than the second cavity width.

Preferably, the body of the pet toy comprises plastic.

Preferably, the first and second portions of the body are releasably connectable by a threaded member connected to the first portion of the body, and wherein the threaded member is adapted to be received within a reciprocal threaded recess formed within the second portion of the body.

Preferably, the first portion of the body comprises an elongate member having a notch formed at an end thereof, and the second portion of the body is adapted to receive the elongate member therein and further comprises a button, a biasing member and a retaining member located between the button and the biasing member, wherein the biasing member biases the retaining member toward the button and holds the retaining member within the notch of the elongate member to prevent the elongate member from being withdrawn from the second portion of the body. In use, the retaining member is released from the second portion of the body when the biasing member is compressed along an axis that is perpendicular to a longitudinal axis of the elongate member by depression of the button along the axis.

BRIEF DESCRIPTION OF THE DRAWINGS

By way of example only, preferred embodiments of the invention will be described more fully hereinafter with reference to the accompanying figures, wherein.

DETAILED DESCRIPTION OF PREFERRED EMBODIMENTS

The present disclosure relates to a pet toy adapted to house a portion of a pet treat within a cavity that extends within a body of the pet toy to prevent a dog from choking on the treat by attempting to consume too much of the treat at once. This also prevents the dog from consuming large pieces of the treat or swallowing the treat whole.

Figure 1:
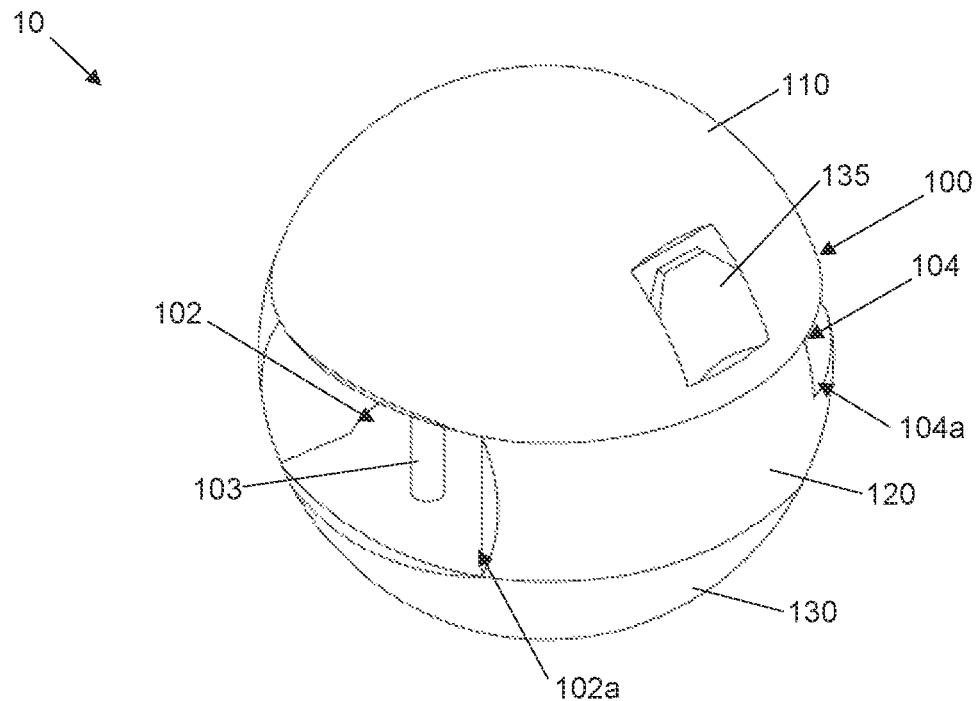
FIG. 1 illustrates a perspective view from a top side of a pet toy in accordance with a first embodiment of the present invention.
Figure 2:
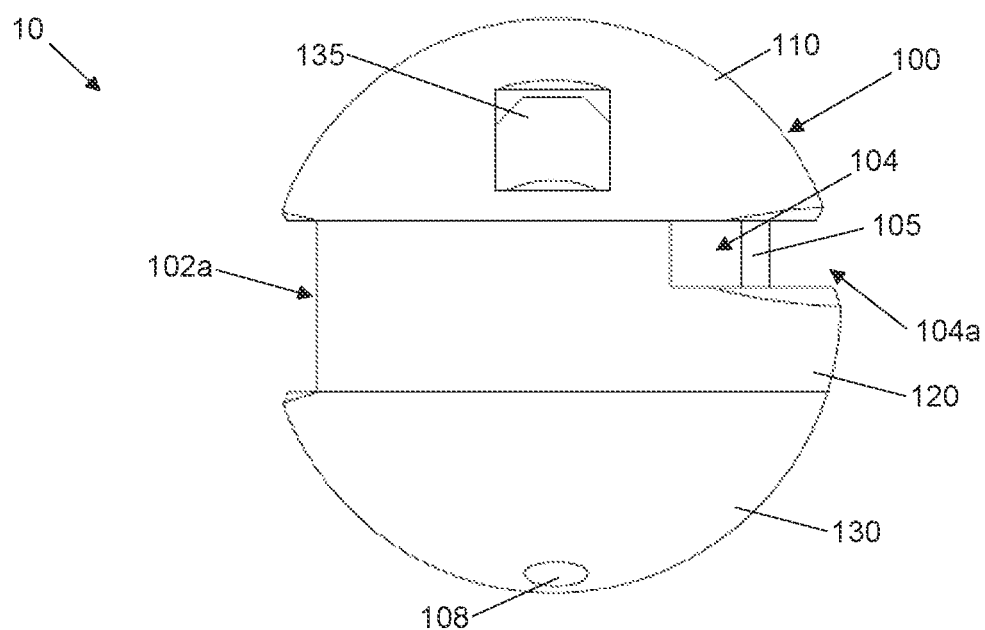
FIG. 2 illustrates a side view of the pet toy of FIG. 1.
Figure 3:
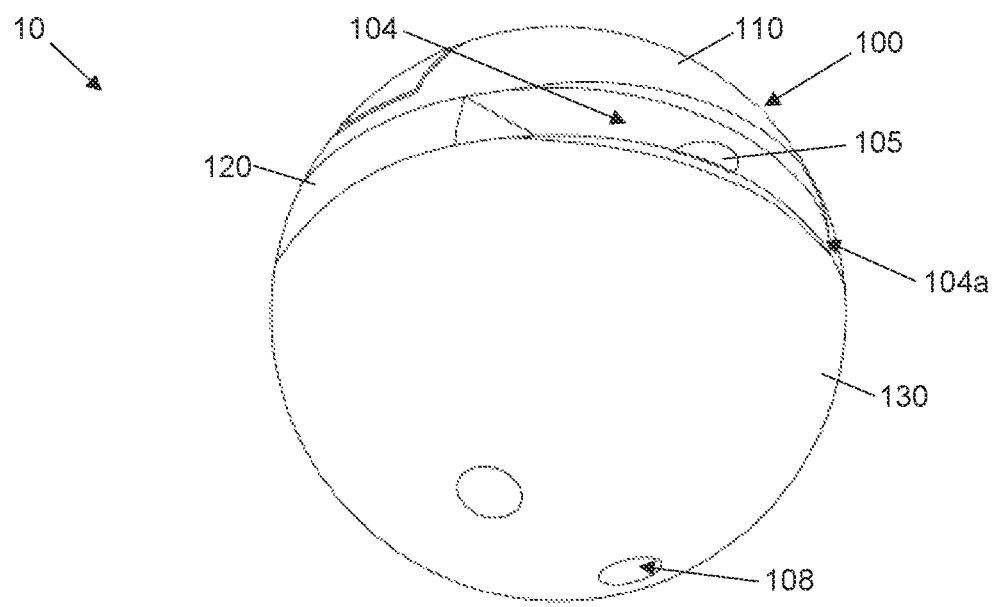
FIG. 3 illustrates a perspective view from an underside of the pet toy of FIG. 1.
Figure 4:
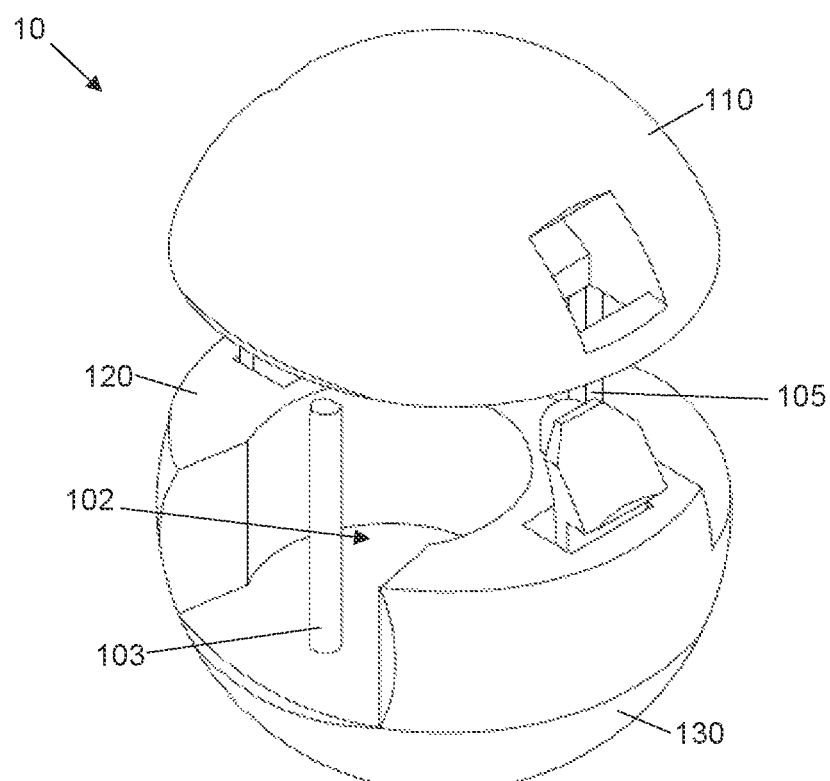
FIG. 4 illustrates the top portion of the pet toy disconnected from the bottom portion.
Figure 5:
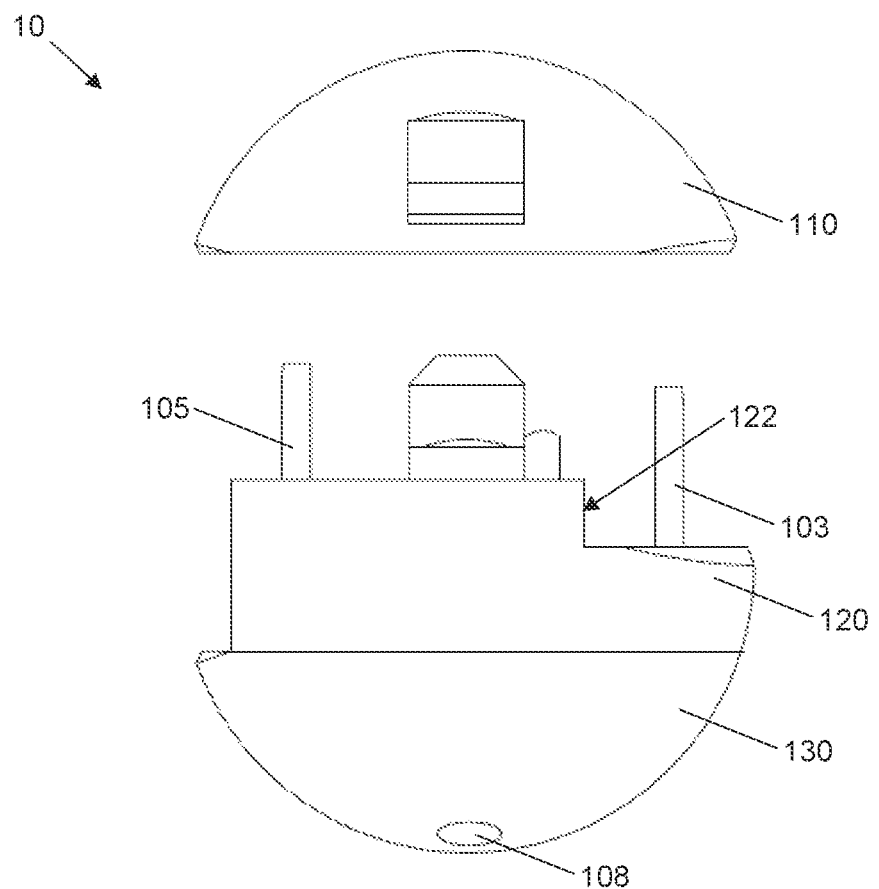
FIG. 5 illustrates a side view of the top portion of the pet toy disconnected from the bottom portion.

FIGS. 1-3 illustrate a pet toy 10 according to a first embodiment of the present invention from a number of views.

The pet toy 10, in an assembled form as shown, includes a substantially spherical body 100 having two open cavities 102, 104 formed in opposite sides of the spherical body 100. The first open cavity 102 is accessible by rectangular opening 102a located on the outer surface of the body 100. The second open cavity 104, located on an opposite side of the spherical body 100, is accessible through rectangular opening 104a located on the outer surface of the body 100.

It can be appreciated from FIGS. 1-3 that first open cavity 102 is narrower but deeper than second open cavity 104 which is comparably shallower and wider. This configuration facilitates the insertion of different types of pet treats (i.e. longer cylindrical bully sticks and the like in the deeper cavity and thinner treats such as jerky and raw hide in the shallower cavity).

First open cavity 102 has a first depth D1 (measured from the circumference of the spherical body 100 to the most recessed portion of the internal cavity 102) and second open cavity 104 has a second depth D2 (measured from the circumference of the spherical body 100 to the most recessed portion of the cavity 104) which is less than depth D1. The opening 102a of first open cavity 102 also has a maximum width W1 which is less than a maximum width W2 of second open cavity 104. This allows treats of different shapes and sizes to be secured within the different cavities.

The spherical body 100 is formed from three portions: a top portion 110, a middle portion 120, and a bottom portion 130, which can be seen in FIGS. 6-11. In use, the middle portion 120 and bottom portion 130 would preferably be connected (by glue, for example) or integrally formed.

Figure 9:
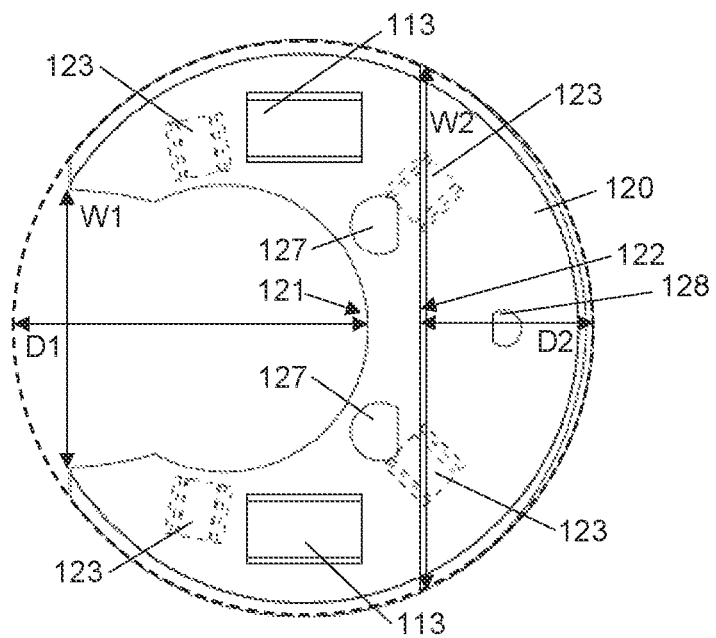
FIG. 9 illustrates a top down version of the middle portion of the pet toy.
Figure 10:
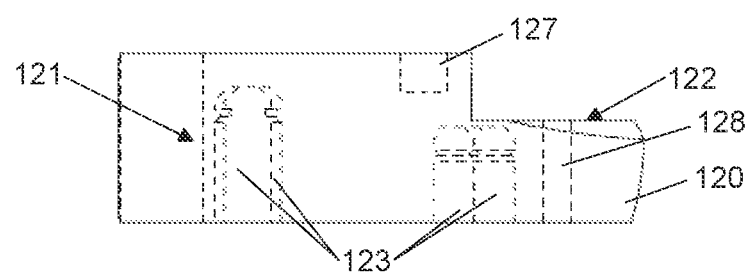
FIG. 10 illustrates a side view of the middle portion of the pet toy.
Figure 11:
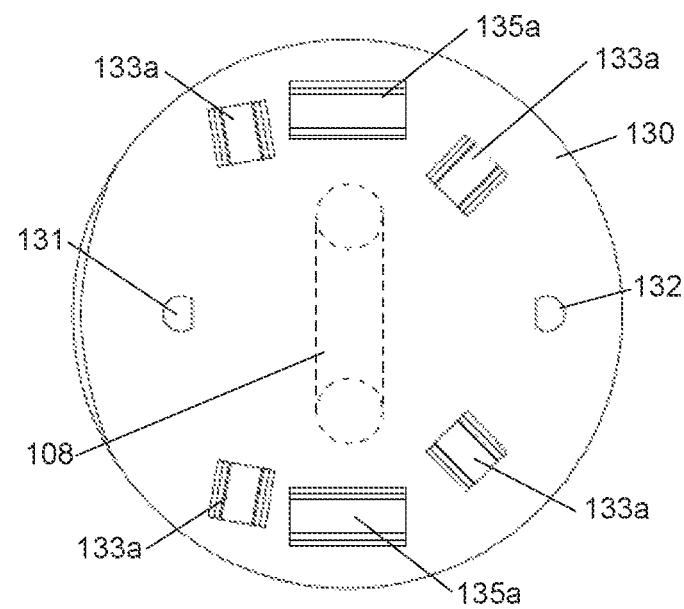
FIG. 11 illustrates a top down view of the bottom portion of the pet toy.

Referring briefly to FIGS. 9 and 10, it can be seen that the middle portion 120 has a substantially circular recessed portion 121 (adjoining rectangular opening 102a) and a stepped portion 122 opposite the recessed portion 121. This recessed portion 121 and stepped portion 122 ultimately define the open cavities 102, 104 when the middle portion 120 is located between the top portion 110 and the bottom portion 130 and the three portions 110, 120, 130 are connected together.

Returning again to FIGS. 1-3, there is shown two securing members in the form of pins 103, 105 located within the open cavities 102, 104, respectively.

In the illustrated embodiment, the pin 103 is secured within a first recess 131 of the bottom portion 130 and extends through cavity 102, between two opposed surfaces of the top portion 110 and bottom portion 130, and into a first recess 111 formed in top portion 110.

Similarly, pin 105 is secured within a second recess 132 formed in the bottom portion 130 and extends through a passageway 128 formed in middle portion 120, through cavity 104 and into a second recess 112 formed in top portion 110. The arrangement of pins 103, 105 and the various recesses and passageways described above can be seen in FIGS. 4-11.

The pins 103, 105, in conjunction with the open cavities 102, 104, allow a pet treat to be secured to the pet toy 10 via a hole formed in the treat. It will be appreciated that the treat may have a pre-existing hole or loop (such as on a twisted/braided bully stick) suitable for locating about the pin or the treat may have a hole manually punched through to allow it to be used with the pet toy 10.

In some embodiments, the open cavities 102, 104 may be interconnected by an internal passageway (not shown) formed through the spherical body 100.

There is also an open-ended passageway 108 formed in the bottom portion 130 of the spherical body 100 which is adapted to receive a rope or similar device. The open-ended passageway 108 can be seen in FIG. 3. This passageway 108 allows the pet toy 10 to be secured to a secondary object (such as a post, for example) or used as a tug-of-war type toy.

Figure 6:
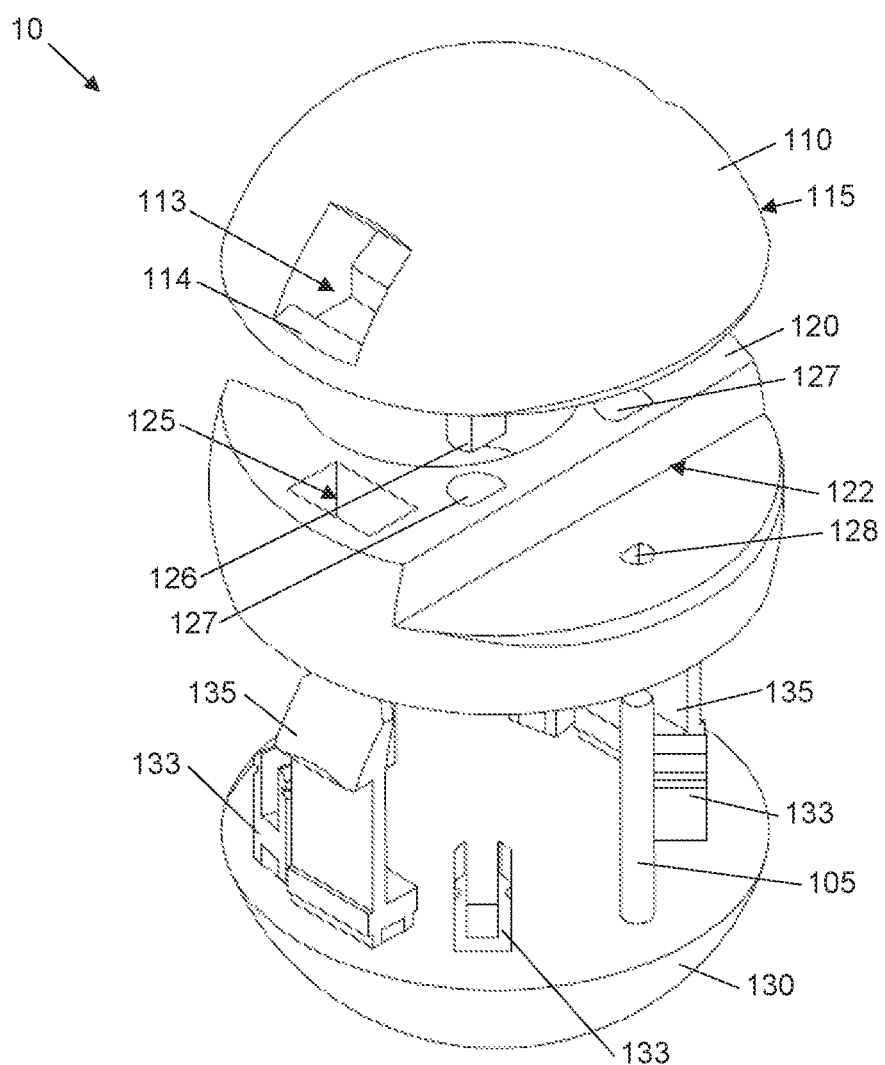
FIG. 6 illustrates an exploded view of the pet toy.
Figure 7:
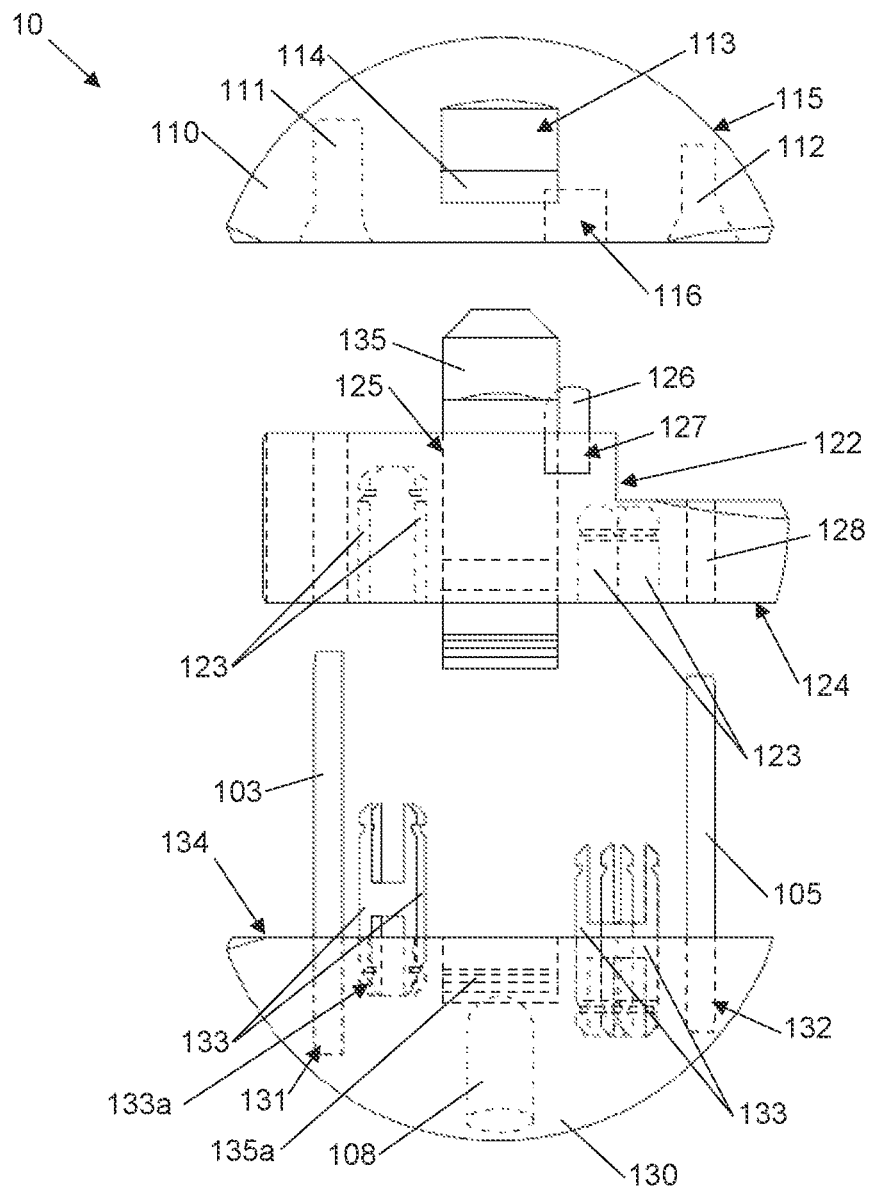
FIG. 7 illustrates a side view of the exploded pet toy.
Figure 8:
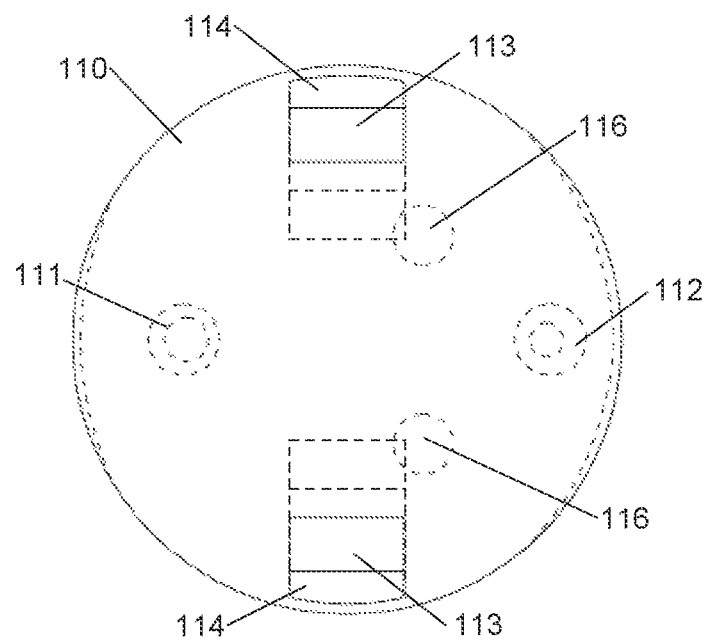
FIG. 8 illustrates a top down view of the top portion of the pet toy.

Turning now to FIGS. 6 and 7, the connection and construction of the spherical body 100 from the top portion 110, middle portion 120 and bottom portion 130 will be described.

Bottom portion 130 includes four pronged clips 133 arranged about the surface 134 of the bottom portion. Ends of the pronged clips 133 are secured within reciprocal recesses 133a in the bottom portion 130 in the illustrations but may of course be integrally formed with the bottom portion 130.

Each of these pronged clips 133 mate with complementarily shaped recesses 123 formed in the middle portion 120 in the surface 124 which will abut the surface 134 of the bottom portion 130 when the pet toy 10 is fully assembled.

Once the middle portion 120 and bottom portion 130 are connected it is envisioned that the two pieces will remain connected as mentioned above.

Two resiliently flexible push release buckle clips 135 are also located within complementary recesses 135a formed in the bottom portion 130. When fully assembled, these push release buckle clips 135 align with and extend through apertures 125, 113 formed in the middle portion 120 and top portion 110, respectively, and ultimately releasably engage with a lip 114 formed where the aperture 113 and the outer surface 115 of the top portion 110 meet.

There is also an alignment formation having two stabilising pins 126 (a male portion) which sit within recesses 127, 116 (a female portion) formed in the middle portion 120 and top portion 110, respectively. The stabilising pins 126 provide increased rigidity and durability to the pet toy 10 when fully assembled and in use by a pet.

Figure 12:
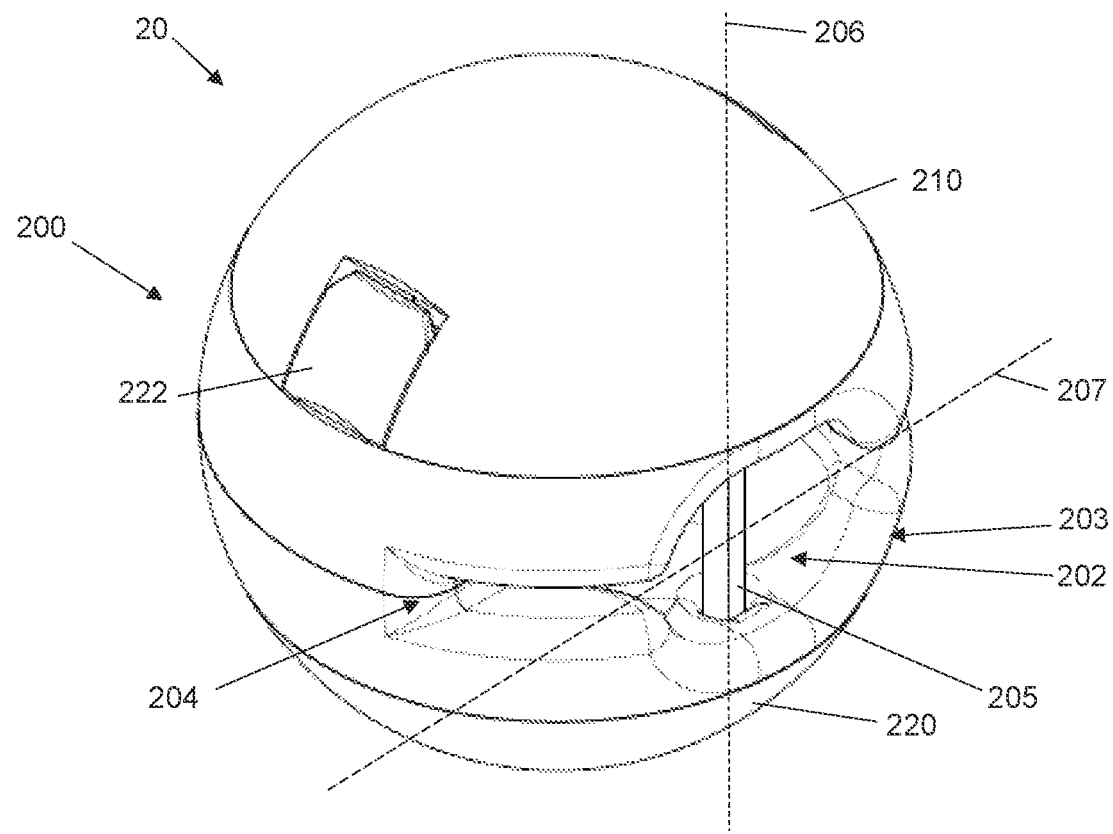
FIG. 12 illustrates a perspective view of the second embodiment of the pet toy.
Figure 13:
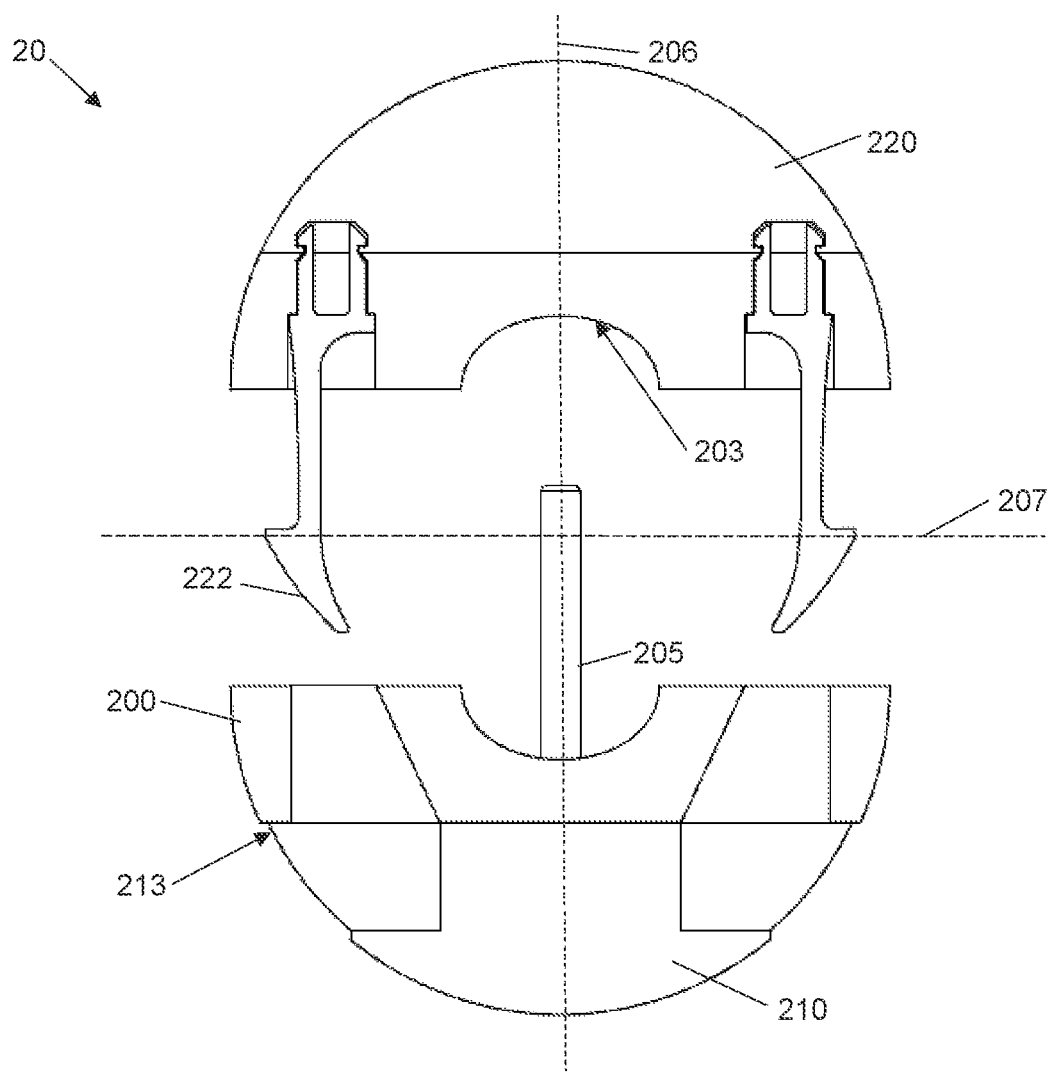
FIG. 13 illustrates an exploded view of the second embodiment of the pet toy.
Figure 14:
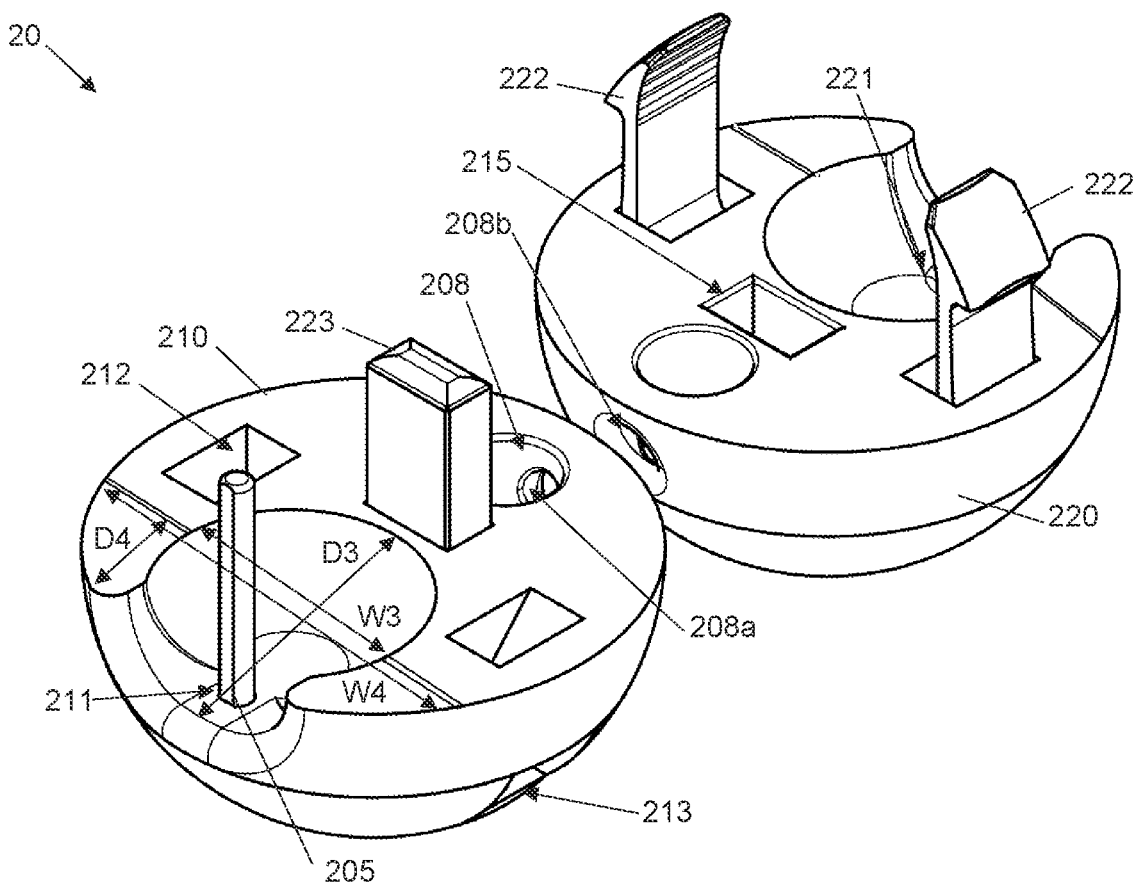
FIG. 14 illustrates the disassembled pet toy of FIG. 12.

Turning to FIGS. 12-14, there is shown a second embodiment of a pet toy 20 in accordance with the present invention described herein.

Pet toy 20 comprises a substantially spherical body 200 having a first open cavity 202 formed therein. The open cavity 202 is accessible by a substantially ovoid opening 203 formed in the surface of the spherical body 200.

A second cavity, effectively superimposed over or in superposition with the first open cavity 202, in the form of an elongate rectangular slot 204 extends longitudinally through the ovoid opening 203. As can be seen in the figures, open cavity 202 has a first depth D3 (measured from the circumference or outer surface of the spherical body 200 to the most recessed portion of the internal cavity 202) and elongate rectangular slot 204 has a second depth D4 (measured from the circumference or outer surface of the spherical body 200 to the most recessed portion of the slot 204) which is less than depth D3. The ovoid opening 203 of open cavity 202 also has a maximum length/width W3 which is less than a maximum length W4 of elongate rectangular slot 204. This allows treats of different shapes and sizes to be secured within the different cavities.

It is envisioned that the open cavity 202 and elongate rectangular slot 204 operates as a combination of open cavities 102, 104 of pet toy 10 which is described above. In this regard, as a combination, open cavity 202 and slot 204 are configured to receive both longer cylindrical bully sticks and the like and thinner treats such as jerky and raw hide in the cavity 202 without compromising the ability of the pet toy 20 to prevent a pet from swallowing a large piece of the treat from the pet toy 20 or from attempting to swallow the treat whole.

Similar to pet toy 10, pet toy 20 includes a securing member in the form of a pin 205 located within the open cavity 202. A longitudinal axis 206 of the pin 205 extends perpendicular to a longitudinal axis 207 of the elongate rectangular slot 204.

The pin 205 is secured within a first recess 221 of a second portion in the form of the bottom portion 220 and extends through cavity 202 and into a first recess 211 formed in a first portion in the form of top portion 210 which is axially aligned with first recess 221 of the bottom portion 220. The pin 205

The pin 205 in conjunction with the open cavity 202 and elongate slot 204 allow a pet treat to be secured to the pet toy 20 via a hole formed in the treat. It will be appreciated that the treat may have a pre-existing hole or loop (such as on a twisted bully stick) suitable for locating about the pin 205 or the treat may have a hole manually punched through to allow it to be used with the pet toy 20.

In one example, a piece of jerky (not shown) can be retained in the pet toy 20. The jerky may require a hole punched through it proximate to an edge of the jerky to allow the pin 205 to extend therethrough. The jerky then extends along the elongate slot 204. A particularly useful aspect of the pet toy 20 resides in the fact that a part of the jerky is held within the cavity 202 of the body 200 which prevents a dog from biting the jerky free from the toy 20 and swallowing large pieces.

A bully stick treat (not shown) can also be retained within the pet toy 20. Similar to the example described above, an end of the bully stick is fully enclosed by the cavity 202. The securement of the bully stick about the pin 205 and the enclosure of the end of the bully stick ensures that a dog cannot access an end of the bully stick (or other enclosed treat) to thereby bite the bully stick off the pin 205 and remove the bully stick unless it first consumes the longer portion of the bully stick which is exposed.

There is also an open-ended passageway 208 formed in the spherical body 200 which is adapted to receive a rope or similar device. The open-ended passageway 208 can be seen in FIG. 14 with each of the top portion 210 and bottom portion 220 having an end/opening 208a, 208b of the passageway 208 formed therein. This passageway 208 allows the pet toy 20 to be secured to a secondary object (such as a post, for example) or used as a tug-of-war type toy.

Turning now to FIGS. 13 and 14, which show the top portion 210 and bottom portion 220 separated from each other, the connection and construction of the spherical body 200 will be described.

Bottom portion 220 includes two resiliently flexible push release buckle clips 222 which, when the pet toy 20 is fully assembled, axially align with and extend through respective apertures 212 formed in the top portion 210. The push release buckle clips 222 each releasably engage with a lip 213 formed where the aperture 212 and the outer surface 214 of the top portion 210 meet.

The bottom portion 220 also includes a stabilising member 223 which is secured within a reciprocally shaped recess formed in the bottom portion 220 and is received within another reciprocally shaped recess 215 formed in the top portion 210. The stabilising member 223 provides increased rigidity and durability to the pet toy 20 when fully assembled and in use by a pet.

In use, the spherical body 200 is disassembled by separating top portion 210 from the bottom portion 220. This disassembly is achieved by pushing the two resiliently flexible push release buckle clips 222 inwardly toward each other. This allows the top portion 210 to move independently of the bottom portion 210 and thus separate the two.

Subsequently, a treat is secured about pin 205 (in a similar manner to the treat shown in FIG. 19).

Once the treat has been secured about the pin 205, the top portion 210 and the bottom portion 220 can be secured together again by aligning the apertures 212 of the top portion 210 with the push release buckle clips 222 of the bottom portion 220 and pushing the two portions 210, 220 together until their inner surfaces abut and the push release buckle clips 222 snap into place over the lips 213 of the top portion 210.

The treat, which is secured about the pin 205, also has a portion that is retained internally within the spherical body 200 which prevents a dog from being able to remove the treat from the pet toy 20 completely thereby preventing the dog from swallowing a large piece of the treat or from attempting to swallow the treat whole.

Figure 15:
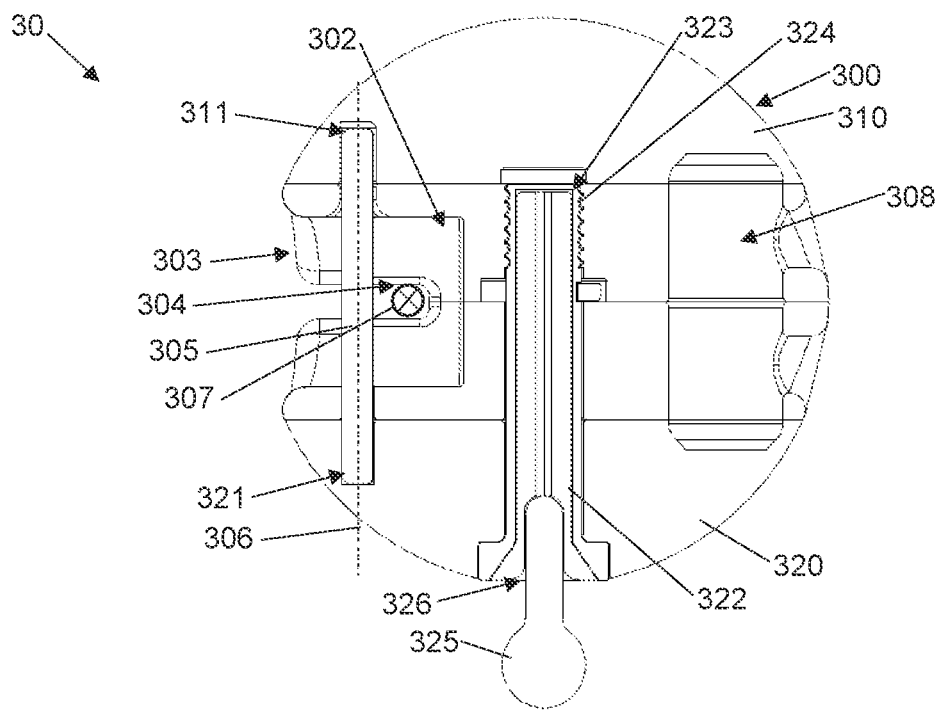
FIG. 15 illustrates a cross-section of a third embodiment of the pet toy.

Pet toy 30, shown in cross-section in FIG. 15, is substantially similar to pet toy 20 but utilises a different locking/securing mechanism.

Pet toy 30 comprises a substantially spherical body 300 having a first open cavity 302 formed therein. The open cavity 302 is accessible by a substantially ovoid opening 303. A second cavity, effectively superimposed over or in superposition with the first open cavity 302, in the form of an elongate rectangular slot 304 extends longitudinally through the ovoid opening 303.

As can be seen in the figures, and as described above in relation to pet toy 20, open cavity 302 has a first depth measured from the circumference of the spherical body 300 to the most recessed portion of the internal cavity 302 and elongate rectangular slot 304 has a second depth measured from the circumference of the spherical body 300 to the most recessed portion of the slot 304 which is less than the first depth.

Similar to pet toy 20, the ovoid opening 303 of open cavity 302 also has a maximum length/width which is less than a maximum length of elongate rectangular slot 304. This allows treats of different shapes and sizes to be securing within the different cavities.

It is envisioned that the open cavity 302 and elongate rectangular slot 304 operates as a combination of open cavities 102, 104 of pet toy 10 which is described above. In this regard, as a combination, open cavity 302 and slot 304 are configured to receive both longer cylindrical bully sticks and the like and thinner treats such as jerky and raw hide in the cavity 302 without comprising the ability of the pet toy 30 to prevent a pet from removing the entirety of the treat from the pet toy 30 by biting off an end of the treat.

Similar to pet toy 20, pet toy 30 includes a securing member in the form of a pin 305 located within the open cavity 302. A longitudinal axis 306 of the pin 305 extends perpendicular to a longitudinal axis 307 (shown by a circle with an 'x') of the elongate rectangular slot 304. It will be understood that the longitudinal axis 307 extends into the page and out of the page toward the reader.

The pin 305 is secured within a first recess 321 of the bottom portion 320 and extends through cavity 302 and into a first recess 311 formed in a first portion of the body in the form of top portion 310 which is axially aligned with a first recess 321 formed in a second portion of the body in the form of bottom portion 320.

The pins 305 in conjunction with the open cavity 302 and elongate slot 304 allow a pet treat to be secured to the pet toy 30 via a hole formed in the treat. It will be appreciated that the treat may have a pre-existing hole or loop (such as on a twisted bully stick) suitable for locating about the pin 305 or the treat may have a hole manually punched through to allow it to be used with the pet toy 30.

Turning now to FIG. 15, which shows the pet toy 30 in cross-section and thereby illustrating the top portion 310 and bottom portion 320. The connection and construction of the spherical body 300 will be described.

Bottom portion 320 includes an elongate threaded member 322 which, when the pet toy 30 is fully assembled, extends into and engages with a recess 323 having a reciprocal thread 324 located in the top portion 310.

The elongate threaded member 322 is actuatable by applying a rotational force. In a preferred embodiment, a key-shaped member 325 is received within a reciprocally shaped slot 326. A user can then apply a rotating or twisting motion to the key-shaped member 325 to rotate the elongate threaded member 322 about the longitudinal axis of the elongate threaded member 322. This rotational motion engages the elongate threaded member 322 with the thread 324 and thereby secure the bottom portion 320 to the top portion 310.

In use, the spherical body 300 is disassembled by separating top portion 310 from the bottom portion 320. This disassembly is achieved by rotating the elongate threaded member 322, preferably using the key-shaped member 325.

Subsequently, a treat may be secured about pin 305.

Once the treat has been secured about the pin 305, the top portion 310 and the bottom portion 320 can be secured together again by aligning the elongate threaded member 322 of the bottom portion 320 with the recess 323 and rotating the threaded member 322 to secure the top portion 310 and bottom portion 320 together.

The treat, which is secured about the pin 305, also has a portion that is retained internally within the spherical body 300 which prevents a dog from being able to remove the treat from the pet toy 30 completely thereby preventing the dog from swallowing a large piece of the treat or from attempting to swallow the treat whole.

There is also an open-ended passageway 308 formed in the spherical body 300 which is adapted to receive a rope or similar device. The open-ended passageway 308 can be seen in FIG. 15. This passageway 308 allows the pet toy 30 to be secured to a secondary object (such as a post, for example) or used as a tug-of-war type toy.

Another embodiment of the pet toy is shown in FIGS. 16-20. Pet toy 40 is substantially similar to pet toy 20 utilising a different locking mechanism. Pet toy 40 comprises a substantially spherical body 400 having a first open cavity 402 formed therein. The open cavity 402 is accessible by a substantially ovoid opening 403. A second cavity, effectively superimposed over or in superposition with the first open cavity 402, in the form of an elongate rectangular slot 404 extends longitudinally through the ovoid opening 403.

As can be seen in the figures, and as described above in relation to pet toy 20, open cavity 402 has a first depth measured from the circumference of the spherical body 400 to the most recessed portion of the internal cavity 402 and elongate rectangular slot 404 has a second depth measured from the circumference of the spherical body 400 to the most recessed portion of the slot 404 which is less than the first depth.

Similar to the pet toy 20, the ovoid opening 403 of open cavity 402 also has a maximum length/width which is less than a maximum length of elongate rectangular slot 404. This allows treats of different shapes and sizes to be securing within the different cavities.

It is envisioned that the open cavity 402 and elongate rectangular slot 404 operates as a combination of open cavities 102, 104 of pet toy 10 which is described above. In this regard, as a combination, open cavity 402 and slot 404 are configured to receive both longer cylindrical bully sticks and the like and thinner treats such as jerky and raw hide in the cavity 402 without comprising the ability of the pet toy 40 to prevent a pet from removing the entirety of the treat from the pet toy 40 by biting off an end of the treat.

Similar to pet toy 20, pet toy 40 includes a securing member in the form of a pin 405 located within the open cavity 402. A longitudinal axis 406 of the pin 405 extends perpendicular to a longitudinal axis 407 of the elongate rectangular slot 404.

The pin 405 is secured within the bottom portion 420 and extends through cavity 402 and into a recess formed in a first portion of the body in the form of top portion 410 which is axially aligned with longitudinal axis of the pin 405 and a first recess (not shown) formed in a second portion of the body in the form of bottom portion 420.

The pins 405 in conjunction with the open cavity 402 and elongate slot 404 allow a pet treat to be secured to the pet toy 40 via a hole formed in the treat. It will be appreciated that the treat may have a pre-existing hole or loop (such as on a twisted bully stick) suitable for locating about the pin 405 or the treat may have a hole manually punched through to allow it to be used with the pet toy 40.

Figure 16:
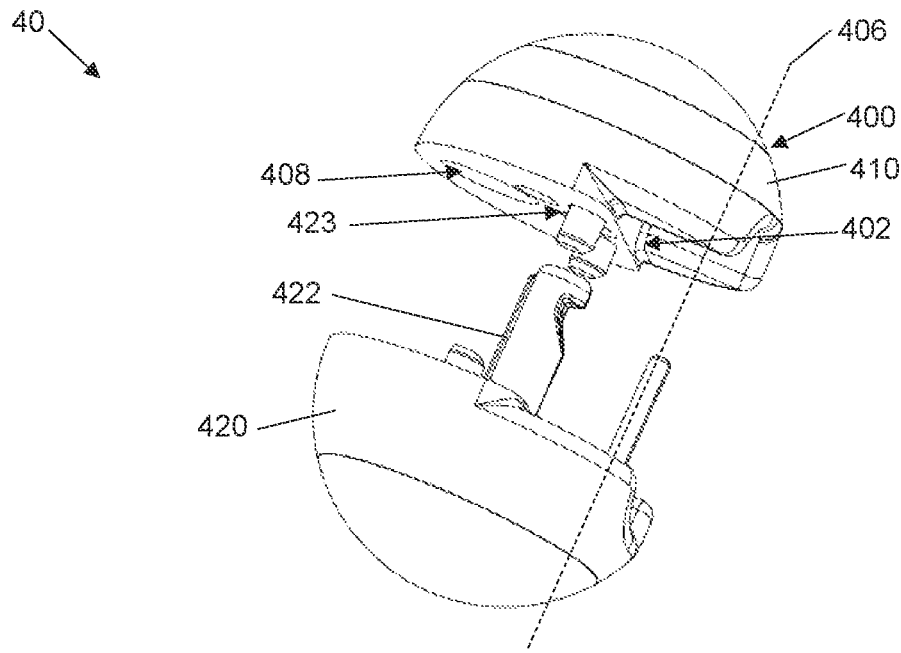
FIG. 16 illustrates the fourth embodiment of the pet toy in a disassembled state.

Turning now to FIG. 16, which shows the pet toy 40 in an exploded view and thereby illustrating the top portion 410 and bottom portion 420. The connection and construction of the spherical body 400 will be described.

Bottom portion 420 includes an elongate member in the form of a notched member 422 which, when the pet toy 40 is fully assembled, extends into and engages with a recess 423 located in the top portion 410. The notched member 422 comprises a notch 425 formed at an end to be received within the top portion 410 of the body 400. As can be seen in the figures, the notch 425 comprises an angled surface adjoining a flat surface which is recessed from the circumference or perimeter of the substantially cylindrical notched member 422.

Figure 17:
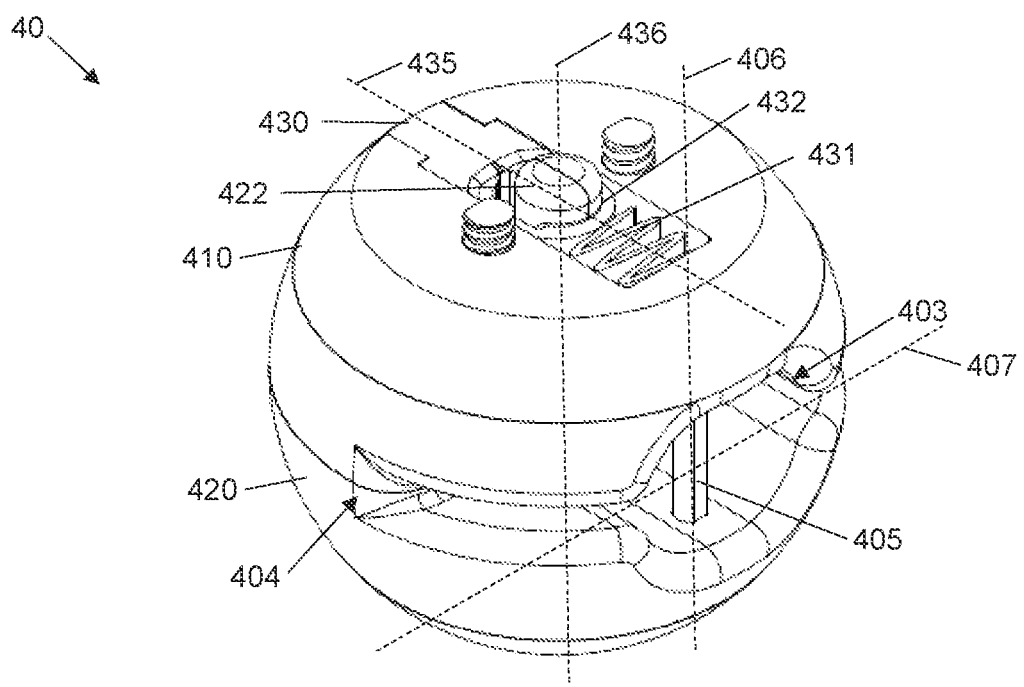
FIG. 17 illustrates the fourth embodiment of the pet toy with a portion of the top removed showing the internal locking mechanism.
Figure 18A:
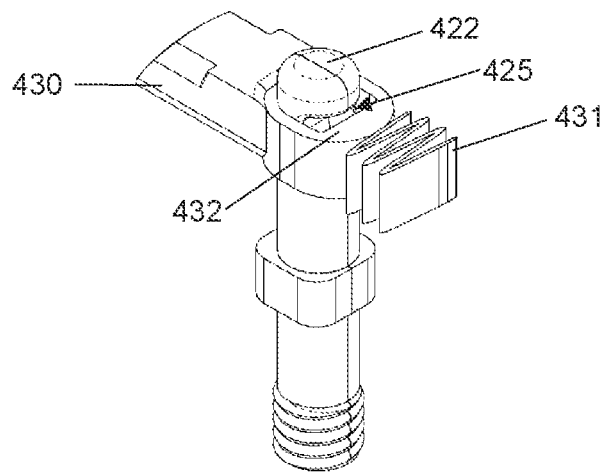
FIG. 18a illustrates the internal locking mechanism of the fourth embodiment of the pet toy.
Figure 18B:
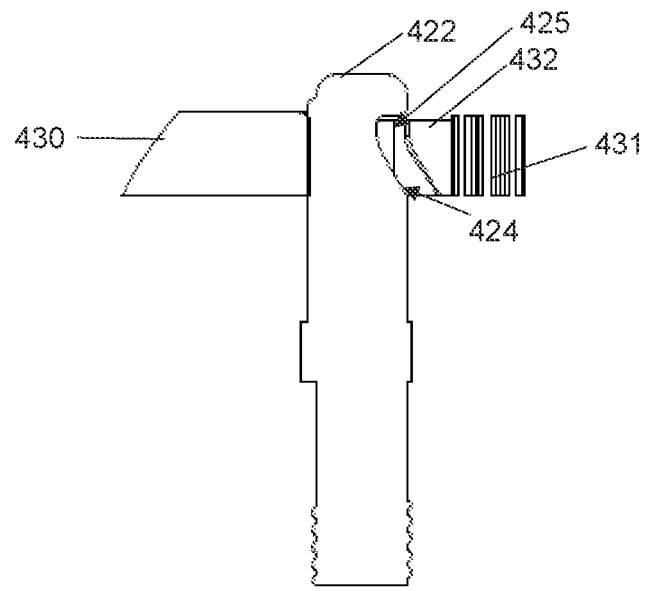
FIG. 18b illustrates the cross-section of the internal locking mechanism of the fourth embodiment of the pet toy.

In FIG. 17, a portion of the top portion 410 has been removed to show the internal locking mechanism which includes a push button 430 that engages with a biasing member in the form of a zigzag spring 431. The zigzag spring 431 biases a retaining member in the form of a retaining portion 432, connected to the button 430, in the direction of the button 430. The retaining portion 432 is complementary to the shape of the notch 425 formed in the notched member 422 such that the surface of the retaining portion 432 adapted to be received within the notch 425 is congruous with the surface defining the notch 425 of the notched member 422. As can be seen in the figures, the retaining portion 432 includes a ramped or angled surface on an inside of the body of the retaining portion 432 which is complementary to the angled surface of the notch 425.

The retaining portion 432 is located between the zigzag spring 431 and button 430, against a notch of the notched member 422 to prevent the notched member 422 from being removed from within the top portion 410. The locking mechanism can also be seen in FIGS. 18a and 18b.

The zigzag spring 431 is compressed by applying a pushing force to the button 430.

In use, the spherical body 400 is disassembled by separating top portion 410 from the bottom portion 420. This disassembly is achieved by applying a compressive or pushing force to the button 430 to compress the zigzag spring 431 to move the retaining portion 432 out of the notch of the notched member 422. The button 430 compresses the zigzag spring 431 along an axis 435 that is perpendicular to a longitudinal axis 436 of the notched member 422.

A user can then simply separate the bottom portion 420 from the top portion 410 by simply pulling the two apart. Subsequently, a treat may be secured about pin 405.

Once the treat has been secured about the pin 405, the top portion 410 and the bottom portion 420 can be secured together again by aligning the notched member 422 with the recess 423 of the top portion 410 and pushing the bottom portion 420 against the top portion 410 such that the notched member 422 is received within the recess 423. The pushing action causes the notched member 422 to move along the longitudinal axis 436 perpendicular to the retaining portion 432. As a result, the notched member 422 slides along a ramped surface 424 on the retaining portion 432, compressing the zigzag spring 431 until the recess of the notched member 422 aligns with the retaining portion 432. When in alignment, the zigzag spring 431 is able to decompress and thus forces the retaining portion 432 into the notch of the notched member 422. The notched member 422 is thus retained in a secure position by the retaining portion 432 and can only be released by depressing the button 405 connected to the retaining portion 432 to compress the zigzag spring 431.

The treat, which is secured about the pin 405, also has a portion that is retained internally within the spherical body 400 which prevents a dog from being able to remove the treat from the pet toy 40 completely thereby preventing the dog from swallowing a large piece of the treat or from attempting to swallow the treat whole.

There is also an open-ended passageway 408 formed in the spherical body 400 which is adapted to receive a rope or similar device. A portion of the open-ended passageway 408 can be seen in FIG. 16. This passageway 408 allows the pet toy 40 to be secured to a secondary object (such as a post, for example) or used as a tug-of-war type toy and is the same as passageways 208, 308 described above.

Figure 19:
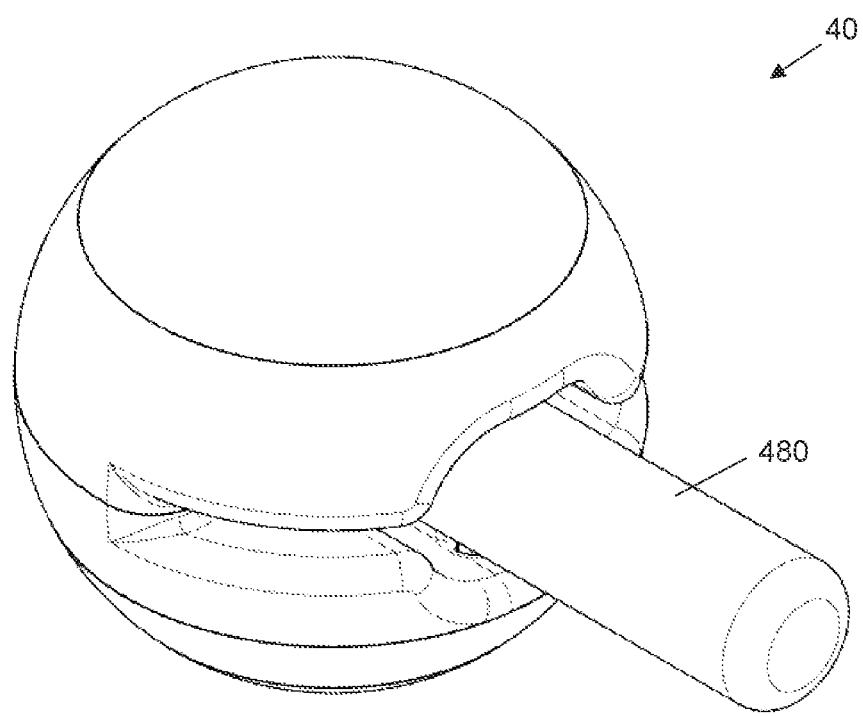
FIG. 19 illustrates the fourth embodiment of the pet toy in use with a dog treat.

In an example shown in FIG. 19, a dog treat, commonly known as a bully stick treat 480, is retained within the pet toy 40. Similar to the examples described above, an end of the bully stick 480 is fully enclosed by the cavity 402. The securement of the bully stick about the pin 405 and the enclosure of the end of the bully stick ensures that a dog cannot access an end of the bully stick (or other enclosed treat) to thereby bite the bully stick off the pin 405 and remove the bully stick unless it first consumes the longer portion of the bully stick which is exposed.

The inventors have found that a spherical body is particularly advantageous as it is a difficult shape for a dog to bite and has no hard edges that the dog can gnaw on.

The spherical body also allows the pet to roll the toy which allows the pet to position the treat at a comfortable angle to chew on.

Embodiments of the pet toy described herein are preferably made from plastic due to its lightweight properties and relative inexpensiveness compared to some other materials.

Nylon and Polyethylene Terephthalate Glycol-Modified ('PETG') are suitable plastic materials from which to manufacture the pet toy. Nylon and PETG are readily available in food grade form, are shock resistant, sufficiently flexible and resilient.

Furthermore, both of the abovementioned materials can be used in 3D printing and injection moulding. Fused filament 3D printing has been identified by the inventors as a preferred manufacturing method because it allows complex hollow shapes in smaller sized batches to be produced with less capital outlay. Advantageously, hollow objects are lighter and use less plastic and thereby reduce production costs. For mass production, injection moulding may be preferable to 3D printing. Stereolithographic 3D printing may also be used to manufacture the pet toy from resin cured by ultraviolet light.

While the embodiments of the pet toy described and illustrated herein are of a substantially spherical shape, it will be appreciated that alternative embodiments of the pet toy may take any shape, including a cube or rectangular prism shape, for example.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step, etc.

The above detailed description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

Throughout the specification and claims (if present), unless the context requires otherwise, the term "substantially" or "about" will be understood to not be limited to the specific value or range qualified by the terms.

The invention claimed is:

1. A pet toy comprising:
a body having a cavity formed therein for receiving a pet treat, the body comprising a first portion and a second portion;
a clip arrangement for releasably connecting the first and the second portions; and
a securing member located within the cavity and extending between two opposed surfaces of the cavity, the securing member for retaining a portion of the pet treat within the cavity, wherein the body defines a recess for receiving the securing member; and
wherein:
the securing member extends from the first portion and is received in the recess defined by the second portion when the first and second portions are connected,
the securing member extends through the cavity and between two opposed surfaces surrounding the cavity, wherein a first surface of the cavity is located on the first portion of the two releasably connectable portions and a second surface of the cavity is located on the second portion of the two releasably connectable portions, and
the securing member comprises a pin secured within the first surface of the cavity located on the first portion of the two releasably connectable portions.

2. The pet toy of claim 1, wherein the securing member is adapted to receive the pet treat thereabout and retain a portion of the pet treat within the cavity formed in the body.

3. The pet toy of claim 1, wherein each of the first and second portions comprise a hemispherical or semi-spherical body.

4. The pet toy of claim 1, wherein the clip arrangement includes a flexibly resilient releasable buckle clip arrangement, and the first and second portions of the body are releasably connectable by the flexibly resilient releasable buckle clip arrangement.

5. The pet toy of claim 4, wherein the buckle clip arrangement comprises one or more resilient flexible projections and one or more corresponding grooves for receiving and retaining the resilient flexible projections.

6. The pet toy of claim 1, wherein the first and second portions of the body are releasably connectable by a threaded member connected to the first portion of the body, and wherein the threaded member is adapted to be received within a reciprocal threaded recess formed within the second portion of the body.

7. The pet toy of claim 1, wherein the first portion of the body comprises an elongate member having a notch formed at an end thereof, and the second portion of the body is adapted to receive the elongate member therein and further comprises a button, a biasing member and a retaining member located between the button and the biasing member, wherein the biasing member biases the retaining member toward the button and holds the retaining member within the notch of the elongate member to prevent the elongate member from being withdrawn from the second portion of the body.

8. The pet toy of claim 1, wherein the body further comprises a passage formed therein, wherein the passage comprises an open-ended passage adapted to receive a rope.

9. The pet toy of claim 1, wherein the cavity is an open cavity formed in a surface of the body and the cavity is substantially enclosed by the body.

10. The pet toy of claim 1, wherein the cavity is a first cavity and the body further comprises a second cavity formed therein for receiving a pet treat.

11. The pet toy of claim 10, wherein the second cavity is formed in a substantially opposite side of the body to the first cavity and a second securing member located within the second cavity and extending between two opposed surfaces of the second cavity.

12. The pet toy of claim 10, wherein the second cavity is formed in a same side of the body as the first cavity, wherein the second cavity extends through the first cavity.

13. The pet toy of claim 12, wherein the second cavity extends longitudinally through the first cavity, wherein a longitudinal axis of the second cavity extends perpendicular to a longitudinal axis of the securing member.

14. The pet toy of claim 12, wherein the first cavity comprises a first cavity depth and a first cavity width, and the second cavity comprises a second cavity depth and a second cavity width.

15. The pet toy of claim 14, wherein the first cavity depth is greater than the second cavity depth.

16. The pet toy of claim 14, wherein the first cavity width is less than the second cavity width.

17. The pet toy of claim 1, wherein the body of the pet toy comprises plastic.

\* \* \* \* \*